April 30, 1963　　　D. W. RICKE　　　3,088,060
CONTROL APPARATUS
Filed May 22, 1961
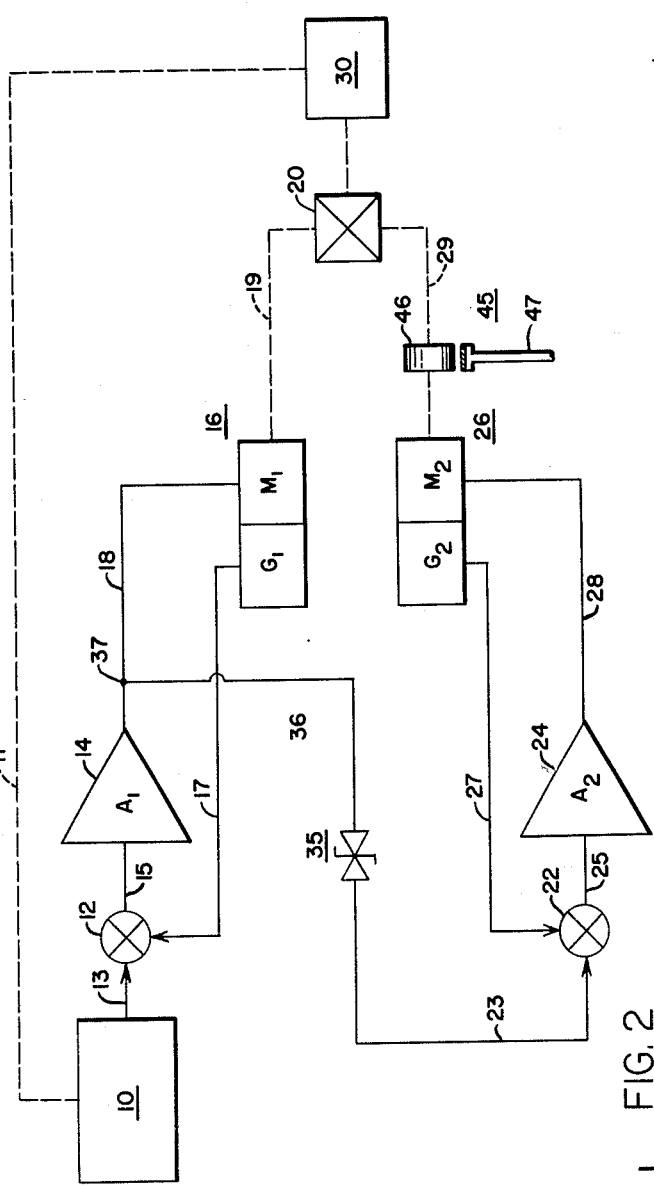
*INVENTOR.*
DONALD W. RICKE
BY Roger W. Jensen
ATTORNEY United States Patent Office 3,088,060
Patented Apr. 30, 1963

3,088,060
CONTROL APPARATUS
Donald W. Ricke, East Bethel, Minn., assignor to Minneapolis-Honeywell Regulator Company, Minneapolis, Minn., a corporation of Delaware
Filed May 22, 1961, Ser. No. 111,753
12 Claims. (Cl. 318—19)

This invention relates to apparatus operable at varying rates and more specifically to a dual speed motor servo having a specific build-up of speed and a smooth change from one speed to the other.

The use of dual speed motor servos in many fields necessitates a predetermined build-up of speed and a smooth shift of speed. That is, in many applications the manner in which the speed of the output shaft of the motor increases is very important. This increase or build-up of output shaft speed is generally spoken of as following a specific curve, which curve is actually input voltage versus output speed. As already explained, in many applications it is very important that the increase in speed of the output shaft follow this specific curve to reach the desired point on the curve rather than following a different curve. Also, when the speed of the output shaft changes from a first rate of increase to a second rate of increase the change must be smooth and without any unwanted variations in the speed.

In some prior art arrangements the speed of the motor servo was changed by means of a clutch and change of gear arrangement. However, this was found to be very jerky and extremely unsatisfactory.

In another prior arrangement two motors driving a summing differential are utilized. In this method a switching means is connected from an interstage point of a first multistage amplifier for driving a motor to the input of a second amplifier for driving a second motor, and the input signal is applied to the first amplifier. When the input signal reaches a certain predetermined amplitude the switch operates and a signal is applied to the second amplifier thereby starting the second motor. However, if a sharp step function of voltage of a high enough amplitude to cause the switch to operate is applied to the input, both motors will start at the same time. When both motors begin to rotate at the same time the build-up speed of the output shaft will not follow the desired curve, but, rather, will take some short cut to reach the point on the curve determined by the amplitude of the input signal. Once this point is reached there may be a tendency to oscillate since there is no way of controlling the amount of the speed of the output shaft which each of the motors is contributing. Since both motors are operating independently they may both attempt to increase enough in speed to contribute the total output speed separately. Thus, the desired speed will be surpassed, and then both motors will tend to slow down simultaneously and independently. It can be seen that some considerable oscillation can occur before the desired point is finally reached. Thus, the prior art arrangements were inadequate for many applications.

The present device, in its preferred embodiment, is comprised of a first and second motor means which may mechanically drive a summing differential means, a first and second amplifier means to drive the motor means, and a switching means connecting the output of the first amplifying means to the input of the second amplifying means. A condition responsive means may be connected to the input of a first amplifier and may in turn be controlled by the output of the summing differential means, but this is not elaborated on since it is not a principal portion of the invention.

The present device utilizes the loading effect which the first motor windings have on the output of the first amplifier. That is, until the motor reaches a certain predetermined speed the impedance of the windings looks relatively small to the output of the amplifier, and the voltage developed across these windings is relatively small. A switching means connects the input of the second amplifying means to the output of the first amplifying means and is so chosen that it will not operate until the voltage across the windings is at a certain predetermined value. Thus, when the motor reaches the desired speed the impedance of the windings, which has slowly increased as the back E.M.F. of the motor has increased, will reach a high enough value to develop a predetermined amplitude of voltage across the switching means. This predetermined amplitude of voltage will cause the switching means to operate and send a signal to the second amplifier which will in turn start the second motor rotating. The loading effect which the first motor has on the first amplifying means will keep the switching means from operating and, thus, keep the second motor from rotating until the first motor has attained the desired speed.

It is a primary object of this invention to provide an improved control apparatus.

It is a further object of this invention to provide an improved dual speed motor servo.

It is a further object of this invention to provide a dual speed motor servo with a smooth switching characteristic.

Still a further object of this invention is to provide a dual speed motor servo with a predetermined output shaft rate of turn with a given input signal.

These and other objects of this invention will become apparent from the following description of a preferred embodiment form thereof and the accompanying specification, claims and drawings of which:

FIGURE 1 is a block diagram of the present apparatus;

FIGURE 2 is a curve of the output characteristics; and

FIGURE 3 is a block diagram showing a portion of the present apparatus.

In FIGURE 1 numeral 10 designates a condition responsive means. This condition responsive means may be any means responsive to a condition such as temperature, pressure or speed. In this preferred embodiment condition responsive means 10 has a mechanical input designated by a dotted line numeral 11 and an electrical output denoted by number 13. An electrical summing point 12 is connected to the condition responsive means 10 by the output means 13. The electrical summing point 12 is also connected to a signal producing means, which in FIGURE 1 is shown as an amplifying means 14, by a lead 15. A motor-generator means 16 is comprised of a velocity generator $G_1$ and a motor $M_1$. This motor-generator means 16 can be any standard electric servomotor, such as the servomotor manufactured by Minneapolis Honeywell as part Number 469139–5. This includes a two phase motor and an A.C. velocity generator but it should be understood that the scope of the invention includes D.C. motors and D.C. velocity generators as well. Velocity generator $G_1$ of motor-generator means 16 is electrically connected to electrical summing point 12 by a lead 17. Motor $M_1$ of motor-generator means 16 is electrically connected to the output of amplifying means 14 by a lead 18. Motor $M_1$ of motor-generator means 16 is mechanically connected to a mechanical summing differential 20, said connection being depicted in FIGURE 1 by dotted line 19.

A second amplifying means 24 is connected to an electrical summing point 22 by means of a lead 25. A second motor-generator means 26, which is similar to motor-generator means 16, is comprised of a velocity generator $G_2$ and a motor $M_2$. Also connected to the electrical summing point 22 is the velocity generator $G_2$ of motor-generator means 26 by a lead 27. The motor-generator means 26 is connected to the output of amplifying means 24 by a lead 28. The motor $M_2$ of motor-generator means 26 is mechanically coupled to the mechanical summing differential 20. This is shown in FIGURE 1 by dotted line 29. The output of the mechanical summing differential means 20 is mechanically coupled to a load 30. The load 30 may consist of a shaft which is to be turned at varying speeds or may simply consist of a gear train. Load 30 may be mechanically coupled to condition responsive means 10, as shown in FIGURE 1 by doted line 11, or may vary a condition, thereby, causing condition responsive means 10 to react.

A switching means, which in FIGURE 1 is designated by numeral 35, in this preferred embodiment consists of two Zener diodes connected back-to-back. One side of these Zener diodes is connected to a point 37 on lead 18 by a lead 36. The other side of Zener diode 35 is connected to the electrical summing point 22 by a lead 23. The Zener diodes connected back-to-back and designated 35 are so chosen that a predetermined voltage at point 37 will cause one of the diodes to break down and the other diode to conduct a forward current, thus, making the entire switching means 35 appear as an electrical short circuit. As long as the voltage at point 37 is below the predetermined amplitude the Zener diode connected backwards in the circuit will not break down and switching means 35 appears as an open circuit. Two diodes are connected back-to-back to insure that current will not flow either way in the circuit until the proper voltage is reached.

The voltage appearing on point 37 is a function of the signal applied to amplifier 14 by condition responsive means 10 and the loading effect which motor $M_1$ of motor-generator means 16 has upon the output of amplifier 14. The loading effect which motor $M_1$ of motor-generator means 16 has upon amplifier 14 is a function of the speed of motor $M_1$. That is, when motor $M_1$ is not rotating the windings appear as nearly a short circuit. As motor $M_1$ begins to rotate a back E.M.F. is built up in the windings, as is well known to one skilled in the art, causing the impedance to increase. As the impedance of the windings increases the voltage dropped across the windings increases and, thus, the voltage at point 37 increases in amplitude. When the voltage at point 37 has increased to the predetermined amplitude to cause switching means 35 to operate a portion of the signal from condition responsive means 10 is fed to the amplifier 24. This causes motor $M_2$ of motor-generator 26 to begin to rotate.

In FIGURE 2 a curve is shown of the rotation rate of the output shaft of the mechanical summing differential means 20 as plotted against the output voltage from the condition responsive means 10 designated $E_1$. The portion of the curve 40 designates the rate of rotation of the output shaft of the mechanical summing differential means 20 when motor $M_1$ of the motor-generator means 16 is running alone. The knee of the curve designated numeral 41 is the point at which motor $M_2$ of motor-generator means 26 begins to rotate. It can be seen that after point 41 the portion of the curve designated 42 indicates a larger increase in the rate of rotation of the output shaft of differential means 20 with a smaller increase of the output voltage of condition responsive means 10. This increase of rate is because of the fact that motor $M_2$ of motor-generator means 26 has begun to rotate and the rotation is added to the rotation of motor $M_1$ by mechanical summing differential means 20. The voltage at point 37 cannot reach a high enough amplitude to operate switching means 35 until motor $M_1$ of motor-generator means 16 reaches a predetermined speed, which is shown as point 41 in FIGURE 2, and, thus, motor $M_2$ of motor-generator means 26 will not be able to begin to rotate until motor $M_1$ reaches this predetermined speed. Thus, the curve shown in FIGURE 2 of the build-up of the output shaft rotation of differential means 20 will always follow the same curve. That is, motor $M_1$ will increase rotation with the increase in output signal from condition responsive means 10, designated $E_1$, until point 41 is reached at which time motor $M_2$ will begin to rotate also and the sum will increase the rate of rotation of the output shaft of differential 20 as shown in FIGURE 2 by the portion 42 of the curve. This is true even if $E_1$ instantaneously reaches some amplitude higher than point 41. In this case motor $M_1$ still must reach the speed designated by point 41 before the voltage at point 37 reaches an amplitude sufficient to operate switching means 35. Thus, motor $M_1$ of motor-generator means 16 acts like a filter for any sharp spikes of input voltage or any step functions of voltage input. The filtering action of motor $M_1$ insures that motor $M_2$ will always react in the desired manner and, thus, give the desired output at differential means 20.

Velocity generator $G_1$ of motor-generator means 16 feeds a negative signal back to amplifying means 14 through lead 17, electrical summing point 12 and lead 15. The negative feedback signal from velocity generator $G_1$ acts as a rate damping signal to improve the system response. Practically, system response means, how closely the output follows the input. For example, if a step function is applied to the amplifying means 14 motor $M_1$ will attempt to instantaneously reach the maximum speed corresponding to the amplitude of the step function. Because of inertia the motor will lag behind the input function and once the peak is reached will tend to overshoot causing oscillations. However, these oscillations are damped out by the negative feedback from the velocity generator $G_1$. At some point in the system response the amount of negative feedback introduced by the velocity generator $G_1$ to amplifier 14 will be just sufficient to damp the signal of the input step function so that motor $M_1$ will overshoot, or oscillate, a minimum number of times and will reach its maximum stable velocity in a minimum of time.

Velocity generator $G_2$ of motor-generator means 26 is connected to the electrical summing point 22 by lead 27. Velocity generator $G_2$ has the same function, that is to improve system response, as velocity generator $G_1$. In addition, however, it also serves as an electrical braking means. When motor $M_1$ is driving one input of differential means 20, because of friction within the differential means 20, the movement of motor $M_1$ may be transmited through differential means 20 to motor $M_2$ causing it to rotate slightly. However, this rotation will be counteracted by the fact that velocity generator $G_2$ will apply a negative signal to the input of amplifier 24 which will in turn attempt to cause motor $M_2$ to rotate the other way.

Also connected to the output shaft 29 of motor $M_2$ of motor-generator means 26 is a friction braking means 45. This friction braking means consists of a drum 46 which rotates with the shaft of motor $M_2$ and a shoe or other friction applying device 47. Shoe 47 is applied to drum 46 to create a friction to stop any unwanted movement of motor $M_2$. Amplifying means 24 may have some small output voltage without having an input voltage. This could be due to residual voltages, noise, or some other disruption within the amplifier. This small output voltage will tend to cause motor $M_2$ to creep. This slight creep is highly undesirable in the closed system in FIGURE 1 for the following reasons. As motor $M_2$ creeps differential 20 has a slight output which is transmitted to load 30. Load 30 in turn causes condition responsive means 10 to produce a signal. This signal is fed to amplifier 14 which causes motor $M_1$ to turn in a direction opposite to that of motor $M_2$ thereby nulling each other in differential 20. It can be seen that if motor $M_2$ is allowed to creep both motors will be turning constantly. Thus, a braking means such as the friction break 45 is used to retard the undesirable movement of motor $M_2$.

An electrical braking means which may be substituted for friction braking means 45 is depicted in FIGURE 3. The output of amplifier 24' in FIGURE 3 is applied to motor $M_2$' through Zener diodes 45' and by means of a lead 28'. The output rotation of motor $M_2$' is coupled to the differential and this is shown in FIGURE 3 by dotted line 29'. Diode means 45' consists of two Zener diodes back-to-back acting as a switching means. That is, unless the voltage on one of the diodes is of large enough amplitude to break it down and cause it to conduct backward while the other diode conducts forward no current will be passed through them. Thus, diode means 45' effectively block any small voltages in the output of amplifying means 24' from being applied to motor $M_2$'. However, when a signal of large enough amplitude is applied to amplifier 24' the output is large enough to break down one of the Zeners in diode means 45' thereby allowing a conduction path to motor $M_2$'. Thus diode means 45' could effectively be used in place of friction break 45'. It is believed that many innovations of this breaking means can be found by one skilled in the art and these two examples are not intended to limit this invention in any way.

It should be noted that this device is not limited to dual speed, but could be three speed, four speed or as many different speeds as desired. Each additional speed may be obtained by simply adding another unit. That is, a switching means connected at the output of the second amplifier to the input of a third amplifier which powers a motor, which in turn operates a differential, would give a third speed. The differential which the third motor operates could be another input of the same differential 20 the first two operate or another differential having two inputs, one of which is the output of differential 20 and the other of which is the output of the third motor. This innovation is not shown since the invention may be depicted completely in a two-speed device. However, the three and four speed devices are mentioned to show one of the advantages in this system.

Thus, a new and novel device has been invented for attaining a plurality of exact speeds. This invention has the advantages of always following the same rate of rotation to input voltage curve, as shown in FIGURE 2, during build-up speed and having a smooth switching process when changing from one rate of rotation to another rate of rotation. Also, this invention has the advantage of insuring that there will be no oscillations in the output rotation regardless of the sharpness of the input voltage.

What has been described is considered to be the preferred embodiment of this invention, but it should be understood that various changes and modifications thereof may be made without departing from the spirit or scope of the invention as defined in the appended claims.

What I claim is:

1. Apparatus of the class described comprising: a mechanical summing differential means, said summing differential means having a first and second input and an output; a first and second motor-generator means; means connecting the motor of said first motor-generator means to the first intput of said summing differential means; means connecting the motor of said second motor-generator means to the second input of said summing differential means; first amplifier means having an input and an output, said input being adapted to have a signal applied thereto; means connecting said output of said first amplifier means to the motor of said first motor-generator means; means connecting the generator of said first motor-generator means to said input of said first amplifier means; a second amplifier means having an input and an output; means connecting said output of said second amplifier means to the motor of said second motor-generator means; means connecting the generator of said second motor-generator means to said input of said second amplifier means; switching means, said switching means being characterized by acting as a substantially open circuit until a predetermined amplitude of voltage is applied thereto; and means connecting said switching means between said output of said first amplifier means and said input of said second amplifier means, said switching means being characterized by being operable in response to said output of said first amplifier means.

2. Apparatus of the class described comprising: a mechanical summing differential means, said summing differential means having a first and second input and an output; a first and second motor-generator means; means connecting the motor of said first motor-generator means to the first input of said summing differential means; means connecting the motor of said second motor-generator means to the second input of said summing differential means; first amplifier means having an input and an output, said input being adapted to have a signal applied thereto, said output having a voltage thereon which is a function of the signal applied to said input and the loading effect of a load applied thereto; means connecting said output of said first amplifier means to the motor-generator means, said motor effectively loading said output of said amplifier means to keep the voltage thereon below a predetermined amplitude when operating below a predetermined speed; means connecting the generator of said first motor-generator means to said input of said first amplifier means; a second amplifier means having an input and an output; means connecting said output of said second amplifier means to the motor of said second motor-generator means; means connecting the generator of said second motor-generator means to said input of said second amplifier means; and switching means controllable to a conducting and a non-conducting condition, said switching means being connected between said output of said first amplifier means and said input of said second amplifier means, and said switching means being normally in the non-conducting condition and controlled to the conducting condition when the voltage on said output of said first amplifier means is above said predetermined amplitude.

3. Apparatus of the class described comprising: a first and second motor-generator means; first amplifier means having an input and an output, said input being adapted to have a signal applied thereto; means connecting said output of said first amplifier means to the motor of said first motor-generator means; means connecting the generator of said first motor-generator means to said input of said first amplifier means; a second amplifier means having an input and an output; means connecting said output of said second amplifier means to the motor of said second motor-generator means; means connecting the generator of said second motor-generator means to said input of said second amplifier means; switching means, said switching means being characterized by acting as a substantially open circuit until a predetermined amplitude of voltage is applied thereto; and means connecting said switching means between said output of said first amplifier means and said input of said second amplifier means, said switching means being characterized by being operable in response to said output of said first amplifier means.

4. Apparatus of the class described comprising: first amplifier means having an input and an output, said input being adapted to have a signal applied thereto; first and second motor means; means connecting said output of said first amplifier means to said first motor means; a second amplifier means having an input and an output; means connecting said output of said second amplifier means to said second motor means; switching means, said switching means being characterized by acting as a substantially open circuit until a predetermined amplitude of voltage is applied thereto; and means connecting said switching means between said output of said first amplifier means and said input of said second amplifier means, said switching means being characterized by being operable in response to said output of said first amplifier means.

5. Apparatus of the class described comprising: a mechanical summing differential means, said summing differential means having a first and second input and an output; a first and second motor means; means connecting said first motor means to the first input of said summing differential means; means connecting said second motor means to the second input of said summing differential means; first amplifier means having an input and an output, said input being adapted to have a signal applied thereto, said output having a voltage thereon which is a function of the signal applied to said input and the loading effect of the load applied thereto; means connecting said output of said first amplifier means to said first motor means, said first motor means effectively loading said output of said first amplifier means to keep the voltage thereon below a predetermined amplitude; a second amplifier means having an input and an output; means connecting said output of said second amplifier means to said second motor means; and switching means controllable to a conducting condition and a non-conducting condition, said switching means being connected between said output of said first amplifier means and said input of said second amplifier means, and said switching means being normally in the nonconducting condition and controlled to the conducting condition when the voltage on said output of said first amplifier means is above said predetermined amplitude.

6. Apparatus of the class described comprising: first amplifier means having an input and an output, said input being adapted to have a signal applied thereto, said output having a voltage thereon which is a function of the signal applied to said input and the loading effect of a load applied thereto; first and second motor means; means connecting said output of said first amplifier means to said first motor means, said first motor means effectively loading said output of said amplifier means to keep the voltage thereon below a predetermined amplitude when operating below a predetermined speed; a second amplifier means having an input and an output; means connecting said output of said second amplifier means to said second motor means; and switching means controllable to a conducting condition and a non-conducting condition, said switching means being connected between said output of said first amplifier means and said input of said second amplifier means, and said switching means being normally in the non-conducting condition and controlled to the conducting condition when the voltage on said output of said first amplifier means is above said predetermined amplitude.

7. Apparatus of the class described comprising: a first and second motor means; signal producing means having an input and an output, said input being adapted to have a signal applied thereto, and said output having a voltage thereon which is a function of the signal applied to said input and the loading effect of a load applied thereto; means connecting said output of said signal producing means to said first motor means, said first motor means effectively loading said output of said signal producing means to keep the voltage thereon below a predetermined amplitude when operating below a predetermined speed; and switching means controllable to a conducting condition and a non-conducting condition, said switching means being connected between said output of said signal producing means and said second motor means, and said switching means being normally in the non-conducting condition and controlled to the conducting condition when the voltage on said output of said signal producing means is above said predetermined amplitude.

8. Apparatus of the class described comprising: a summing differential means having a first and second input and an output; condition responsive means; means connecting said output of said differential means to said condition responsive means; a first and second motor means; signal producing means having an input and an output; means connecting said input to said condition responsive means, and said output having a voltage thereon which is a function of the signal applied to said input and the loading effect of a load applied thereto; means connecting said output of said signal producing means to said first motor means, said first motor means effectively loading said output of said signal producing means to keep the voltage thereon below a predetermined amplitude when operating below a predetermined speed; switching means controllable to a conducting condition and a non-conducting condition, said switching means being connected between said output of said signal producing means and said second motor means being normally in the non-conducting condition and controlled to the conducting condition when the voltage on said output of said signal producing means is above said predetermined amplitude; and means connecting said first motor means to said first input of said differential means and said second motor means to said second input of said differential means.

9. Apparatus of the class described comprising: a mechanical summing differential means, said summing differential means having a first and second input and an output; a first and second motor-generator means; means connecting the motor of said first motor-generator means to the first input of said summing differential means; means connecting the motor of said second motor-generator means to the second input of said summing differential means; braking means, said braking means substantially arresting any creep of the motor of said second motor-generator means; first amplifier means having an input and an output, said input being adapted to have a signal applied thereto, said output having a voltage thereon which is a function of the signal applied to said input and the loading effect of a load applied thereto; means connecting said output of said first amplifier means to the motor-generator means, said motor effectively loading said output of said amplifier means to keep the voltage thereon below a predetermined amplitude when operating below a predetermined speed; means connecting the generator of said first motor-generator means to said input of said first amplifier means; a second amplifier means having an input and an output; means connecting said output of said second amplifier means to the motor of said second motor-generator means; means connecting the generator of said second motor-generator means to said input of said second amplifier means; and switching means controllable to a conducting and a non-conducting condition, said switching means being connected between said output of said first amplifier means and said input of said second amplifier means, and said switching means being normally in the non-conducting condition and controlled to the conducting condition when the voltage on said output of said first amplifier means is above said predetermined amplitude.

10. Apparatus of the class described comprising: a summing differential means having a first and second input and an output; condition responsive means; means connecting said output of said differential means to said condition responsive means; a first and second motor means; signal producing means having an input and an output, means connecting said input to said condition responsive means, and said output having a voltage thereon which is a function of the signal applied to said input and the loading effect of a load applied thereto; means connecting said output of said signal producing means to said first motor means, said first motor means effectively loading said output of said signal producing means to keep the voltage thereon below a predetermined amplitude when operating below a predetermined speed; switching means controllable to a conducting condition and a non-conducting condition, said switching means being connected between said output of said signal producing means and said second motor means, said switching means being normally in the non-conducting condition and controlled to the conducting condition when the voltage on said output of said signal producing means is above said predetermined amplitude; means connecting said first motor means to said first input of said differential means and said second motor means to said second input of said differential means; and braking means, said braking means substantially arresting any creep of said second motor means.

11. Apparatus of the class described comprising: a first and second motor-generator means; signal producing means having an input and an output, said input being adapted to have a signal applied thereto, said output having a voltage thereon which is a function of the signal applied to said input and the loading effect of a load applied thereto; means connecting said output of said signal producing means to the motor of said first motor-generator means, said motor of said first motor-generator means effectively loading said output of said signal producing means to keep the voltage thereon below a predetermined amplitude when operating below a predetermined speed; switching means controllable to a conducting condition and a non-conducting condition, said switching means being connected between said output of said signal producing means and the motor of said second motor-generator means, said switching means being normally in the non-conducting condition and controlled to the conducting condition when the voltage on said output of said signal producing means is above said predetermined amplitude; means connecting said generator of said first motor-generator means to said input of said signal producing means; and means electrically connecting said generator of said second motor-generator means to said motor of said second motor-generator means.

12. Apparatus of the class described comprising: a summing differential means having a first and second input and an output; condition responsive means; means connecting said output of said differential means to said condition responsive means; a first and second motor-generator means; signal producing means having an input and an output, means connecting said input to said condition responsive means, and said output having a voltage thereon which is a function of the signal applied to said input and the loading effect of a load applied thereto; means connecting said output of said signal producing means to the motor of said first motor-generator means, said motor of said first motor-generator means effectively loading said output of said signal producing means to keep the voltage thereon below a predetermined amplitude when operating below a predetermined speed; means connecting said generator of said first motor-generator means to said input of said signal producing means; means electrically connecting said generator of said second motor-generator means to the motor of said second motor-generator means; switching means controllable to a conducting and a non-conducting condition, said switching means being connected between said output of said signal producing means and the motor of said second motor-generator means, said switching means being normally in the non-conducting condition and controlled to the conducting condition when the voltage on said output of said signal producing means is above said predetermined amplitude; means connecting the motor of said first motor-generator means to said first input of said differential means and the motor of said second motor-generator means to said second input of said differential means; and means connecting said output of said differential means to said input of said condition responsive means.

References Cited in the file of this patent

UNITED STATES PATENTS

| | | |
|---|---|---|
| 2,751,535 | Kuhnel | June 19, 1957 |
| 2,798,992 | Adler | July 9, 1957 |
| 2,802,160 | Engeler | Aug. 6, 1957 |